(12) United States Patent
Kamiya

(10) Patent No.: US 10,466,084 B2
(45) Date of Patent: *Nov. 5, 2019

(54) AIRFLOW MEASURING DEVICE

(71) Applicant: DENSO CORPORATION, Kariya, Aichi-pref. (JP)

(72) Inventor: Shinichi Kamiya, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/964,801

(22) Filed: Apr. 27, 2018

(65) Prior Publication Data

US 2018/0245961 A1    Aug. 30, 2018

Related U.S. Application Data

(63) Continuation of application No. 14/479,635, filed on Sep. 8, 2014, now Pat. No. 9,983,038.

(30) Foreign Application Priority Data

Oct. 30, 2013    (JP) .................................. 2013-225984

(51) Int. Cl.
*G01F 15/04*    (2006.01)
*G01F 25/00*    (2006.01)
(Continued)

(52) U.S. Cl.
CPC ............. *G01F 1/684* (2013.01); *F02D 41/18* (2013.01); *G01F 1/6842* (2013.01); *G01F 5/00* (2013.01); *G01F 15/04* (2013.01); *G01F 15/043* (2013.01); *G01F 15/046* (2013.01); *G01K 13/02* (2013.01); *F02D 2200/0414* (2013.01); *F02D 2200/0418* (2013.01); *G01K 2013/024* (2013.01); *G01K 2205/02* (2013.01)

(58) Field of Classification Search
CPC ............. G01F 15/02; G01F 15/04; G01F 1/68
See application file for complete search history.

(56) References Cited

U.S. PATENT DOCUMENTS 4,683,159 A    7/1987    Bohrer et al.
2003/0182999 A1    10/2003    Kouno
(Continued)

FOREIGN PATENT DOCUMENTS

| DE | WO 2012055621 A1 | 5/2012 |
|---|---|---|
| JP | 2008-304232 A | 12/2008 |
| JP | 2010-043883 A | 2/2010 |

*Primary Examiner* — Herbert K Roberts

(57) ABSTRACT

A housing defines a bypass passage and a sub-bypass passage therein. A bypass passage is configured to draw a part of an air flowing through a duct. The sub-bypass passage branches off the bypass passage and is configured to draw a part of air flowing through the bypass passage. A flow rate sensor is arranged in the sub-bypass passage and configured to generate an electric signal according to a flow rate of air in the duct by performing heat transfer with air passing through the sub-bypass passage. A physical quantity sensor is configured to measure a physical quantity of air in the duct. A sensor assembly is integrally formed with the flow rate sensor, the physical quantity sensor, and a circuit module. The circuit module includes a substrate that is configured to process signals from the flow rate sensor and the physical quantity sensor.

12 Claims, 4 Drawing Sheets

(51) Int. Cl.
   *G01F 1/684*   (2006.01)
   *F02D 41/18*   (2006.01)
   *G01F 5/00*    (2006.01)
   *G01K 13/02*   (2006.01)

(56) References Cited

U.S. PATENT DOCUMENTS

| | | |
|---|---|---|
| 2005/0284216 A1 | 12/2005 | Tanaka |
| 2006/0150708 A1* | 7/2006 | Bierl ............... G01F 25/003 73/1.16 |
| 2008/0148842 A1 | 6/2008 | Oda |
| 2008/0302173 A1 | 12/2008 | Saito et al. |
| 2008/0307867 A1 | 12/2008 | Enomoto |
| 2010/0031737 A1 | 2/2010 | Saito et al. |
| 2011/0072894 A1 | 3/2011 | Saito |
| 2011/0107832 A1 | 5/2011 | Sakuma |
| 2012/0085324 A1 | 4/2012 | Saito |
| 2012/0247202 A1 | 10/2012 | Kohno |
| 2013/0019675 A1 | 1/2013 | Ban |
| 2013/0055799 A1* | 3/2013 | Tsujii ............... G01F 1/6842 73/114.32 |
| 2015/0114098 A1 | 4/2015 | Kamiya |
| 2015/0177043 A1* | 6/2015 | Tokuyasu ............ G01F 1/692 73/202.5 |

* cited by examiner

AIRFLOW MEASURING DEVICE

CROSS REFERENCE TO RELATED APPLICATION

This application is a continuation of U.S. patent application Ser. No. 14/479,635 filed on Sep. 8, 2014, which claims the benefit of Japanese Patent Application No. 2013-225984 filed on Oct. 30, 2013, the disclosure of which is incorporated herein by reference.

TECHNICAL FIELD

The present disclosure relates to an airflow measuring device, which is equipped to an air intake passage of an engine to measure a flow quantity of air drawn into the engine.

BACKGROUND

Conventionally, a known thermal-type airflow measuring device is equipped to an air intake passage of an engine. The airflow measuring device is configured to draw a part of air, which flows through the air intake passage, and to cause heat transfer with the drawn air, thereby to measure a flow quantity of air drawn into the engine.

Patent Document 1 discloses an airflow measuring device equipped with an intake-air temperature sensor and a moisture sensor in addition to a flow sensor.

It is noted that, the airflow measuring device according to Patent Document 1 has two different passages including one passage, which is equipped with the flow sensor, and the other passage, which is equipped with the moisture sensor. Therefore, the configuration of Patent Document 1 may require connection forms between sensors and an external device, which are significantly different among sensors. In addition, the configuration of Patent Document 1 may require complicated arrangement of wirings and complicated mounting process of the sensors. Furthermore, the configuration of Patent Document 1 may require large modification in configuration of the housing of the airflow measuring device and large modification in a mounting process of the sensors, in a case where the number of a sensor other than the flow sensor and a type of the sensor are selectively modified for each product.

(Patent Document 1)
Japanese Patent Gazette No. 5178388

SUMMARY

It is an object of the present disclosure to produce an airflow measuring device, which is equipped with an additional sensor such as an intake-air temperature sensor and a moisture sensor and is configured to facilitate a mounting process of the sensor.

According to an aspect of the present disclosure, an airflow measuring device comprises a housing, a bypass passage, a flow rate sensor, a physical quantity sensor, and a sensor assembly. The housing defines a bypass passage and a sub-bypass passage therein. The bypass passage is configured to draw a part of an air flowing through a duct. The sub-bypass passage branches off the bypass passage and is configured to draw a part of air flowing through the bypass passage. The flow rate sensor is arranged in the sub-bypass passage and configured to generate an electric signal according to a flow rate of air in the duct by performing heat transfer with air passing through the sub-bypass passage. The physical quantity sensor is configured to measure a physical quantity of air in the duct. The sensor assembly is integrally formed with the flow rate sensor, the physical quantity sensor, and a circuit module. The circuit module includes a substrate that is configured to process signals from the flow rate sensor and the physical quantity sensor.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION

Figure 1:
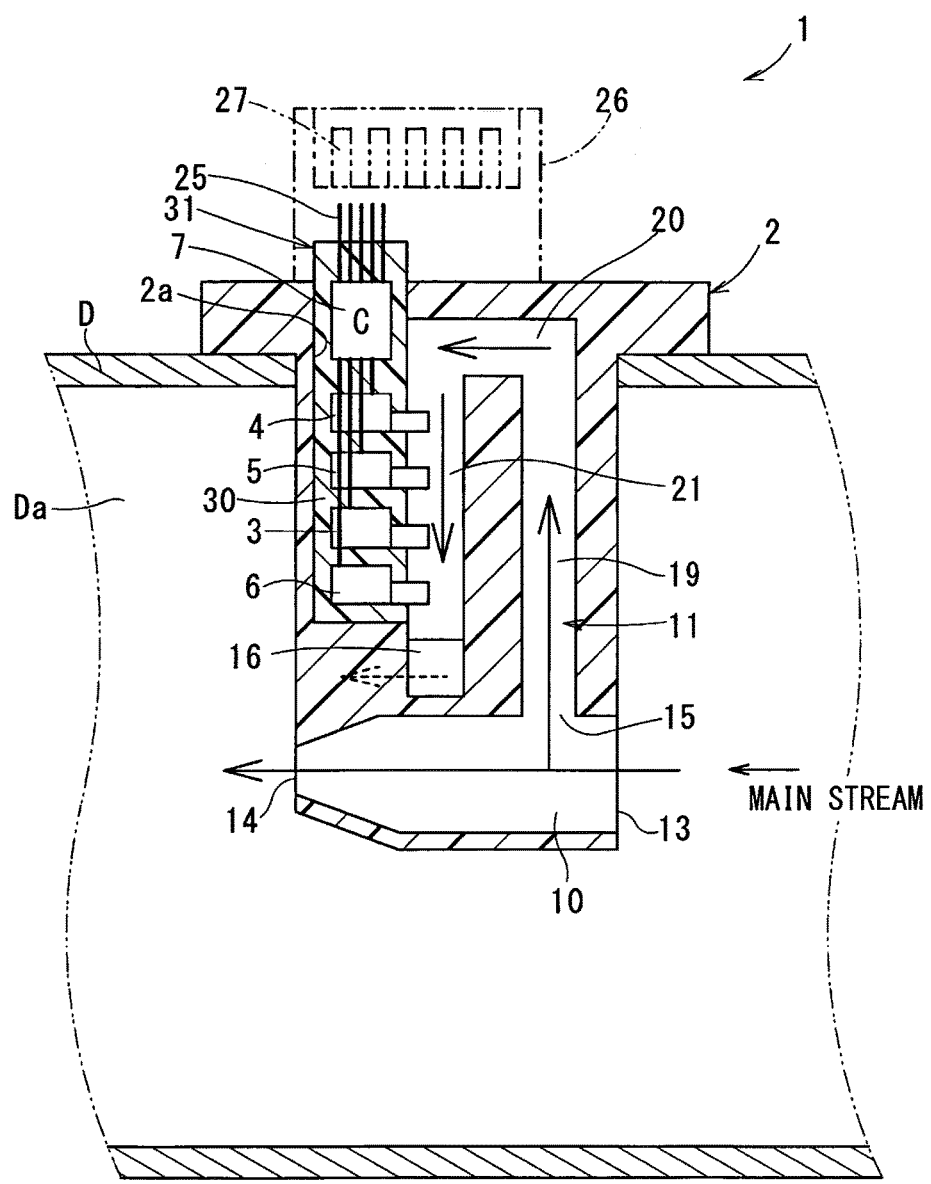
FIG. 1 is a schematic sectional view showing one example of an airflow measuring device according to an embodiment.

As follows, embodiments according to the present disclosure will be described in detail.

(Configuration)

A configuration of an airflow measuring device 1 according to an embodiment will be described with reference to FIGS. 1 and 2. The airflow measuring device 1 is, for example, an air flow meter for measuring a flow quantity of air drawn into a vehicular engine. The airflow measuring device 1 is mounted to a duct D, which is connected to a downstream of an air cleaner. The airflow measuring device 1 includes a housing 2, a flow sensor 3, multiple sensors 4 to 6, a circuit module 7, and/or the like, which are integrated into one component. The multiple sensors 4 to 6 are other than the flow sensor 3. Details of the components of the airflow measuring device 1 will be described later.

The housing 2 is located in a duct. The housing 2 internally defines a bypass passage 10 and a sub-bypass passage 11. The bypass passage 10 receives a part of air, which flows through a main passage Da formed in the duct D. The sub-bypass passage 11 is branched from the bypass passage 10 to receive a part of air, which flows through the bypass passage 10.

The bypass passage 10 includes a bypass inlet 13 and a bypass outlet 14. The bypass inlet 13 opens in a surface of the housing 2 on the upstream side of the mainstream. The bypass outlet 14 opens in a surface of the housing 2 on the downstream side of the mainstream. The bypass passage 10 forms a passage linearly from the bypass inlet 13 toward the bypass outlet 14 along the direction of the mainstream (FIG. 1).

The sub-bypass passage 11 includes a sub-bypass inlet 15 and a sub-bypass outlet 16. The sub-bypass inlet 15 is branched from the bypass passage 10. The sub-bypass outlet 16 opens toward the downstream side of the mainstream. The sub-bypass passage 11 is substantially in a U-shape to connect the sub-bypass inlet 15 with the sub-bypass outlet 16.

Figure 2:
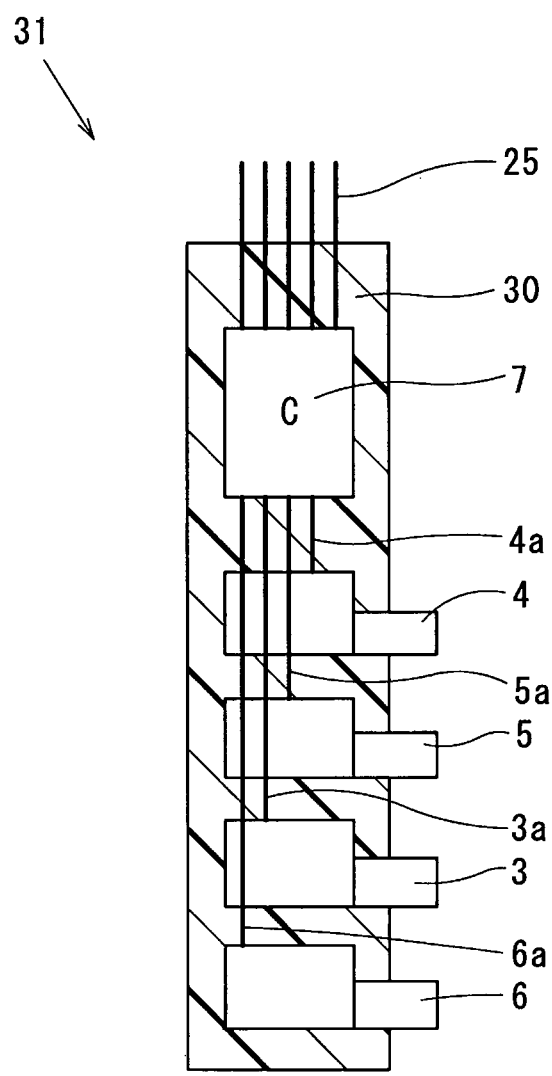
FIG. 2 is a schematic sectional view showing one example of a sensor assembly according to the embodiment.

More specifically, as shown in FIG. 1, the sub-bypass passage 11 includes a first passage 19, a second passage 20, and a third passage 21. The first passage 19 directs air, which flows from the sub-bypass inlet 15, outward in the radial direction of the mainstream. That is, the first passage 19 directs the air upward in the vertical direction (upward in the drawing). Subsequently, the second passage 20 directs the air toward the downstream side of the mainstream. Subsequently, the third passage 21 directs the air inward in the radial direction of the mainstream. That is, the third passage 21 directs the air downward in the vertical direction (downward in the drawing).

Air, which is drawn into the bypass passage 10, passes through the bypass passage 10 linearly. Therefore, dust in the air is applied with an inertial force to pass through the bypass passage 10 linearly. The present structure enables to remove dust from the air at the branch between the bypass passage 10 and the sub-bypass passage 11. Therefore, the air, from which dust is removed, flows from the sub-bypass inlet 15.

Referring to FIG. 1, the flow sensor 3 is located in the sub-bypass passage 11. The flow sensor 3 is configured to cause heat transfer with the drawn air and to generate an electric signal according to a flow quantity of the air. Thus, the flow sensor 3 sends the electric signal. The flow sensor 3 is configured with, for example, an exothermic element and a temperature sensing element each being a thin film resistive element. The exothermic element and the temperature sensing element may be formed on a surface of a semiconductor circuit board (not shown) accommodated in the circuit module 7. The flow sensor 3 is electrically connected with the circuit board via a wiring 3a.

The multiple sensors 4 to 6 other than the flow sensor 3 are configured to measure various physical quantities of air, which flows through the interior of the duct. According to the present embodiment, the multiple sensors 4 to 6 are an intake-air temperature sensor 4, a moisture sensor 5, and a pressure sensor 6.

The intake-air temperature sensor 4 is configured to detect a temperature of air, which flows through the main passage Da. The intake-air temperature sensor 4 is electrically connected with the circuit board, which is accommodated in the circuit module 7, via a wiring 4a. The moisture sensor 5 is configured to detect a moisture of air, which flows through the main passage Da. The moisture sensor 5 is electrically connected with the circuit board, which is accommodated in the circuit module 7, via a wiring 5a. The pressure sensor 6 is configured to detect a pressure of air, which flows through the main passage Da. The pressure sensor 6 is electrically connected with the circuit board, which is accommodated in the circuit module 7, via a wiring 6a.

The circuit module 7 accommodates a circuit board including a control circuit, an output circuit, and/or the like. The control circuit controls electricity supplied to the various sensors 3 to 6. The output circuit is configured to process the electric signals, which are sent from the various sensors 3 to 6, and to send the processed signals to an external ECU. The external ECU is an electronic control unit for control of the engine.

Terminals 25 are connected to the circuit board and are projected from the circuit module 7. The terminals 25 are connected with terminal pins 27 inside a housing. The terminal pins 27 are equipped to a connector 26. The connector 26 is connected with a connector of the ECU thereby to electrically connect the circuit module 7 with the ECU via the terminal pins 27.

(Features)

As follows, examples of features of the airflow measuring device 1 according to the embodiment will be described. In the present embodiment, the various sensors 3 to 6 are equipped inside the sub-bypass passage 11. The various sensors 3 to 6 are arranged along the flow direction of air in the sub-bypass passage 11.

According to the present embodiment, the third passage 21 is, for example, extended linearly. In addition, the various sensors 3 to 6 are located, for example, in line along the flow direction of air in the third passage 21. The various sensors 3 to 6 are arranged from the upstream side in a specific order. Specifically, the intake-air temperature sensor 4, the moisture sensor 5, the flow sensor 3, and the pressure sensor 6 are arranged from the upstream side in order. The various sensors 3 to 6 are equipped such that sensing portions of the various sensors 3 to 6 are exposed in the sub-bypass passage 11.

In the drawing, the circuit module 7 is located on the upper side of the raw of the various sensors 3 to 6, which are arranged in line. The circuit module 7 is located at the outside of the various sensors 3 to 6 relative to the radial direction of the duct. The various sensors 3 to 6 are equipped with the wirings, respectively. In the drawing, the wirings of the various sensors 3 to 6 are extended upward and are connected with the circuit module 7.

The various sensors 3 to 6 are modularized together with the circuit module 7 into one component. Specifically, the various sensors 3 to 6 and the circuit module 7 are, for example, affixed inside a casing 30, which is formed of resin, and are integrated into a sensor assembly (assembly 31) as a single component.

The assembly 31 is inserted in a mounting hole 2a, which is formed in the housing 2, thereby to enable the various sensors 3 to 6 to be equipped inside the sub-bypass passage 11. In the present embodiment, a part of the outer periphery of the casing 30 forms a part of a wall surface of the sub-bypass passage 11.

(Effects)

In the airflow measuring device 1 according to the present embodiment, the various sensors 3 to 6 are equipped inside the sub-bypass passage 11. In addition, the various sensors 3 to 6 are arranged along the flow direction of air in the sub-bypass passage 11. That is, the present configuration may enable to locate the various sensors 3 to 6 substantially in line inside the common passage. Therefore, the present configuration may enable to connect the various sensors 3 to 6 with an external device in a common form (similar form). Thus, the present configuration may enable to simplify arrangement of the wirings and a mounting process of the wirings.

For example, as exemplified above in the embodiment, the circuit module 7 is located on the side of one end of the raw of the various sensors 3 to 6, which are arranged substantially in line. In this way, the present configuration may enable to unify the directions, in which the wirings 3a to 6a are extended from the various sensors 3 to 6 toward the circuit module 7. In addition, the present configuration may enable to unify connection forms of the various sensors 3 to 6 with the circuit module 7 and to unify connection forms of the various sensors 3 to 6 with the external device (ECU) through the circuit module 7. That is, the present configuration may enable to unify the connection forms thereby to facilitate a mounting process of the various sensors 3 to 6.

Figure 3:
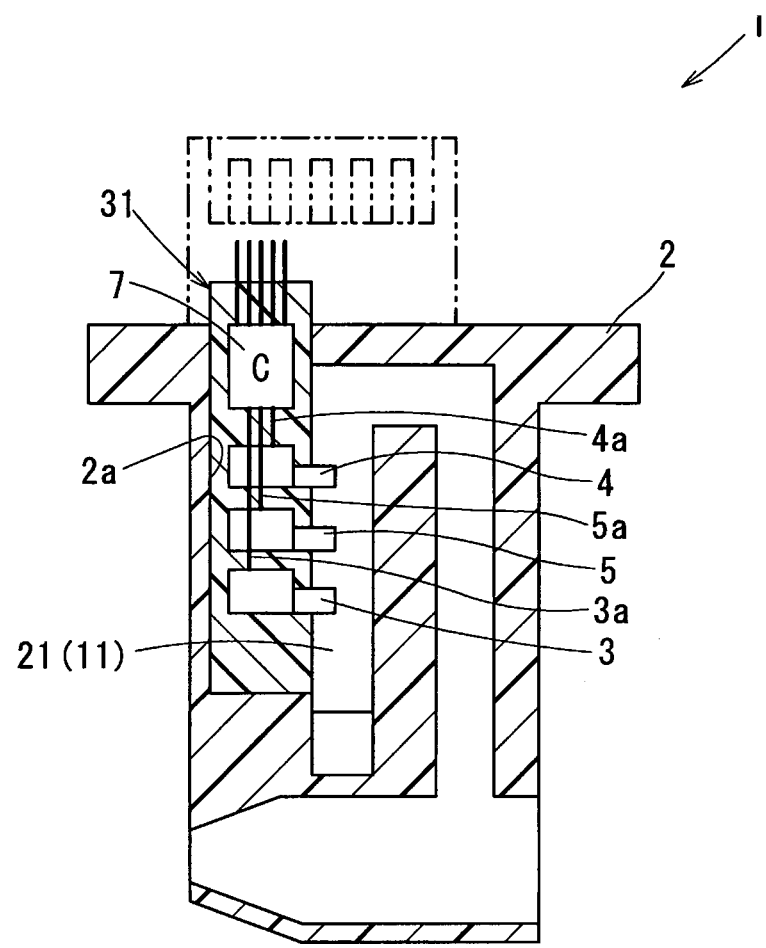
FIG. 3 is a schematic sectional view showing another example of the airflow measuring device according to the embodiment.
Figure 4:
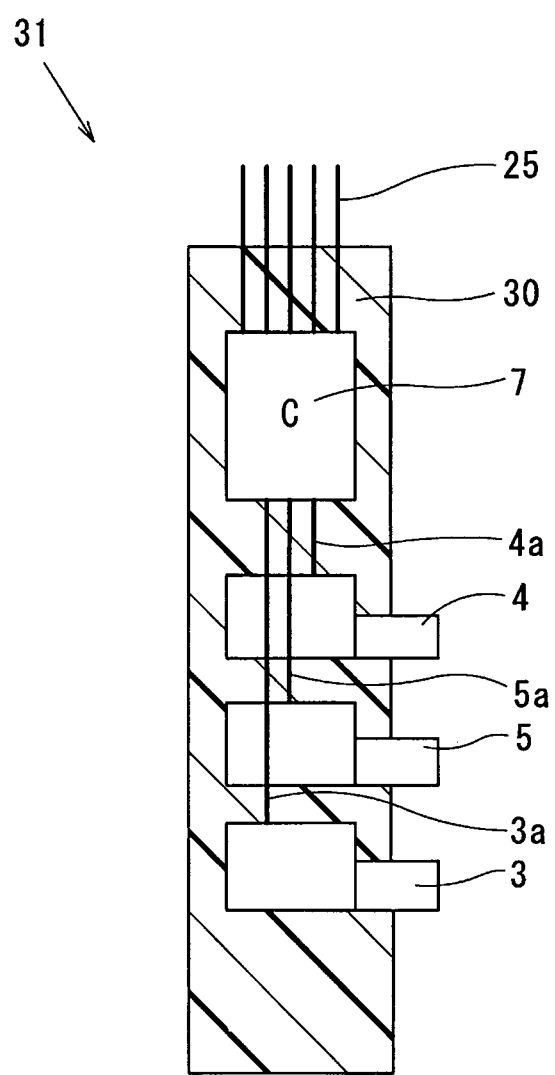
FIG. 4 is a schematic sectional view showing another example of the sensor assembly according to the embodiment.

In addition, the present configuration may enable to select the number of the sensors 4 to 6 other than the flow sensor 3 and to select the types of the sensors 4 to 6 other than the flow sensor 3 for each product, without a significant change in the configuration of the housing 2 and in the mounting process. For example, in a specific product, the pressure sensor 6 may be unnecessary among the multiple sensors 4 to 6 other than flow sensor 3. In such a case, as shown in FIGS. 3 and 4, the present configuration according to the present embodiment may easily enable to manufacture a variation of the product, which excludes the pressure sensor 6.

In addition, the present configuration may enable to locate the various sensors 3 to 6 inside the sub-bypass passage 11. Therefore, the present configuration may enable to protect the various sensors 3 to 6 from influence of disturbance, such as pulsation, and to enhance accuracy of measurement of the flow quantity of air. In addition, the present configuration may enable to reduce intrusion of dust into the sub-bypass passage 11 thereby to enhance durability of the various sensors 3 to 6 located in the sub-bypass passage 11.

In addition, according to the present embodiment, the various sensors 3 to 6 are integrated with the circuit module 7 into the assembly 31 as a single component. The present configuration may enable to mount the various sensors 3 to 6 into the sub-bypass passage 11 with a single mounting process to mount the assembly 31 to the housing 2. Therefore, the present configuration may enable to facilitate the mounting process. It is noted that, the various sensors 3 to 6 may be modularized and may be connected with the circuit module 7.

In addition, according to the present embodiment, the intake-air temperature sensor 4, the moisture sensor 5, and the flow sensor 3 are arranged in the order of the intake-air temperature sensor 4, the moisture sensor 5, and the flow sensor 3 from the upstream side. It is further noted that, the flow sensor 3 causes the exothermic element to generate heat. In consideration of this, the intake-air temperature sensor 4 is located on the upstream side of the flow sensor 3. Thus, the present configuration may enable to protect the intake-air temperature sensor 4 from influence of heat generated by the flow sensor 3.

It is further noted that, the moisture sensor 5 may generate heat, in addition to the flow sensor 3. In consideration of this, the intake-air temperature sensor 4 is located on the upstream side of the moisture sensor 5. Thus, the present configuration may enable to protect the intake-air temperature sensor 4 from influence of heat generated by the flow sensor 3. In general, generation of heat from the flow sensor 3 may be greater than generation of heat from the moisture sensor 5. Therefore, the intake-air temperature sensor 4, the moisture sensor 5, and the flow sensor 3 may be arranged in this order from the upstream side.

The airflow measuring device according to the present disclosure includes the housing, the flow sensor, and the multiple sensors, which are other than the flow sensor. The housing defines the bypass passage and the sub-bypass passage. The bypass passage is configured to draw a part of air, which flows through the interior of the duct. The sub-bypass passage is branched from the bypass passage and configured to draw a part of air, which flows through the bypass passage. The flow sensor is equipped in the sub-bypass passage and configured to cause heat transfer with air, which passes through the sub-bypass passage, and to generate an electric signal according to a flow quantity of air in the duct.

The multiple sensors, which are other than the flow sensor, are configured to measure physical quantities of air in the duct. The multiple sensors include the intake-air temperature sensor and the moisture sensor. The intake-air temperature sensor is configured to measure a temperature in the duct. The moisture sensor is configured to measure a humidity in the duct.

The flow sensor and the multiple sensors are equipped in the interior of the sub-bypass passage. The flow sensor and the multiple sensors are located along the direction of flow of air in the sub-bypass passage.

The present configuration enables to locate the flow sensor and the multiple sensors, other than the flow sensor, in line in the interior of the common passage. Therefore, the present configuration enables to unify connection forms of the sensors with an external device. In addition, the present configuration enables to facilitate handling of the wirings and the mounting process of the wirings. In addition, the present configuration may enable to select the number of the sensors, which are other than the flow sensor, and to select the types of the sensors, which are other than the flow sensor, for each product, without a significant change in the configuration of the housing and in the assembly process.

It should be appreciated that while the processes of the embodiments of the present disclosure have been described herein as including a specific sequence of steps, further alternative embodiments including various other sequences of these steps and/or additional steps not disclosed herein are intended to be within the steps of the present disclosure.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. An airflow measuring device configured to measure a flow rate of an air flowing through a duct extending along a center axis thereof, the airflow measuring device comprising:
    a housing that protrudes inward from the duct toward the center axis and defines a bypass passage and a sub-bypass passage therein, the bypass passage configured to draw a part of the air flowing through the duct, the sub-bypass passage branching off the bypass passage and configured to draw a part of air flowing through the bypass passage;
    a flow rate sensor that is arranged in the sub-bypass passage and configured to generate an electric signal according to a flow rate of air in the duct by performing heat transfer with air passing through the sub-bypass passage;
    a physical quantity sensor that is configured to measure a physical quantity of air in the duct; and
    a sensor assembly that is integrally formed with the flow rate sensor, the physical quantity sensor, and a circuit module, the circuit module including a substrate that is configured to process signals form the flow rate sensor and the physical quantity sensor, wherein
    the sensor assembly extends along a protruding direction of the housing,
    the flow rate sensor and the physical quantity sensor are arranged along the protruding direction,
    the physical quantity sensor includes an intake-air temperature sensor,
    the flow rate sensor is closer to the center axis of the duct than the intake-air temperature sensor,
    the flow rate sensor is not directly adjacent to the intake-air temperature sensor, the physical quantity sensor includes a pressure sensor and a humidity sensor, and the intake-air temperature sensor is located upstream of the pressure sensor and the humidity sensor in a flow direction of air flowing through the housing.

2. The airflow measuring device according to claim 1, wherein the housing includes a mounting hole, and the sensor assembly is inserted into the mounting hole and attached to the housing.

3. The airflow measuring device according to claim 1, wherein the flow rate sensor, the physical quantity sensor, and the circuit module are covered, in a liquid-tight manner, by a casing made of resin.

4. The airflow measuring device according to claim 3, wherein the physical quantity sensor and the circuit module are electrically connected to each other by a wire that is covered by the casing in a liquid-tight manner.

5. The airflow measuring device according to claim 1, wherein the sensor assembly extends along the protruding direction of the housing to protrude inwardly from an inner wall of the duct, a connector is disposed on the housing outside of the duct, and the circuit module is located between the humidity sensor and the connector in the protruding direction.

6. The airflow measuring device according to claim 1, wherein the sensor assembly extends along the protruding direction of the housing to protrude inwardly from an inner wall of the duct, a connector is disposed on the housing outside of the duct, and the circuit module is located between the flow rate sensor and the connector in the protruding direction.

7. The airflow measuring device according to claim 1, wherein the sensor assembly extends along the protruding direction of the housing to protrude inwardly from an inner wall of the duct, a connector is disposed on the housing outside of the duct, and the intake-air temperature sensor is located between the flow rate sensor and the connector in the protruding direction.

8. The airflow measuring device according to claim 1, wherein the sensor assembly extends along the protruding direction of the housing to protrude inwardly from an inner wall of the duct, a connector is disposed on the housing outside the duct, and the humidity sensor is located between the flow rate sensor and the connector in the protruding direction.

9. The airflow measuring device according to claim 1, wherein the sensor assembly extends along the protruding direction to protrude inwardly from an inner wall of the duct, and the circuit module is located such that at least a portion of the circuit module overlaps with the sub-bypass passage when viewed in a direction perpendicular to the protruding direction.

10. The airflow measuring device according to claim 1, wherein the sub-bypass passage has a midpoint, and the flow rate sensor and the physical quantity sensor are located downstream of the midpoint of the sub-bypass passage.

11. The airflow measuring device according to claim 1, wherein the sensor assembly includes a wall portion defining a portion of the sub-bypass passage, and the wall portion is in contact with at least a portion of the circuit module.

12. An airflow measuring device comprising:

a housing that defines a bypass passage and a sub-bypass passage therein, the bypass passage configured to draw a part of an air flowing through a duct that extends along a center axis thereof, the sub-bypass passage branching off the bypass passage and configured to draw a part of air flowing through the bypass passage;

a flow rate sensor that is arranged in the sub-bypass passage and configured to generate an electric signal according to a flow rate of air in the duct by performing heat transfer with air passing through the sub-bypass passage;

a physical quantity sensor that is arranged in the sub-bypass passage and configured measure a physical quantity of air in the duct; and a sensor assembly that is integrally formed with the flow rate sensor, the physical quantity sensor, and a circuit module, the circuit module including a substrate that is configured to process signals form the flow rate sensor and the physical quantity sensor, wherein the physical quantity sensor includes an intake-air temperature sensor, a humidity sensor and a pressure sensor, the intake-air temperature sensor is positioned upstream of the humidity sensor and the pressure sensor in a flow direction of air flowing through the housing, and the flow rate sensor is not located upstream of the intake-air temperature sensor in the flow direction of air.

* * * * *